United States Patent [19]

Murase et al.

[11] 4,224,286
[45] Sep. 23, 1980

[54] REGENERATION EQUIPMENT FOR SPENT ACTIVATED CARBON

[75] Inventors: Tamotsu Murase; Shintaro Fujimoto; Yukinori Kasuga; Naoki Takada; Hajime Sasaki; Nobuo Miwa, all of Ube, Japan

[73] Assignee: Ube Industries, Ltd., Japan

[21] Appl. No.: 918,154

[22] Filed: Jun. 22, 1978

[30] Foreign Application Priority Data

Jun. 28, 1977 [JP] Japan .................... 52-76123

[51] Int. Cl.$^2$ .................... B01J 8/00; C01B 17/82; F26B 17/12
[52] U.S. Cl. .................... 422/205; 422/215; 422/216; 422/219; 422/204; 422/223; 422/229; 252/420; 34/168; 34/169; 432/194
[58] Field of Search .............. 422/219, 223, 228, 229, 422/212, 215, 216, 204, 205; 55/34, 61, 96, 181, 198, 98, 487, 512, 518; 366/338, 339; 252/420, 411 R; 34/165, 174, 147, 167, 171, 168, 169; 432/95, 194, 96, 98, 99, 100

[56] References Cited

U.S. PATENT DOCUMENTS

| | | | |
|---|---|---|---|
| 1,439,151 | 12/1922 | Dailey et al. | 55/487 |
| 2,640,845 | 6/1953 | Beck et al. | 422/216 |
| 2,883,333 | 4/1959 | Oliver | 422/223 |
| 3,246,960 | 4/1966 | Sharp et al. | 422/223 |
| 3,827,888 | 8/1974 | Terwilliger | 366/339 |
| 4,007,014 | 2/1977 | Matsumoto et al. | 252/420 |
| 4,008,994 | 2/1977 | Namasaki et al. | 34/168 |

FOREIGN PATENT DOCUMENTS 5315714   8/1973   Japan ..................... 422/204

Primary Examiner—R. E. Serwin
Assistant Examiner—Chris Konkol
Attorney, Agent, or Firm—McGlew and Tuttle

[57] ABSTRACT

A regeneration equipment for spent activated carbon comprises a regeneration reactor provided vertically through a vertical heating furnace and an integrated body of a longitudinal series of numerous spiral elements fixedly provided almost throughout the length of said regeneration reactor. Steam ducts are provided so that they are inserted in said regeneration reactor at about the middle portion thereof. On the outside surface of the wall of said regeneration reactor, fixedly provided are exhaust chambers, each of which communicates at its bottom portion with the inside of said regeneration reactor through exhaust holes provided in the wall of said reactor, and is filled with heat-resisting balls piled up in three layers so that the balls in the top and bottom layers are larger in diameter than said exhaust holes and those in the middle layer are similar in diameter to activated carbon particles. This equipment further comprises a drying hood provided on the top of said heating furnace, said drying hood includes a drying hopper provided through said drying hood and on the top of said regeneration reactor. The drying hopper includes a drying-process waste gas exhaust pipe having an opening in the vicinity of the upper most end of said integrated body of the spiral elements in the regeneration reactor.

5 Claims, 4 Drawing Figures

REGENERATION EQUIPMENT FOR SPENT ACTIVATED CARBON

FIELD AND BACKGROUND OF THE INVENTION

The present invention relates in general to a regeneration equipment for spent activated carbon, and in particular to a vertical regeneration equipment therefor which is provided with an improved regeneration reactor and a dryer for drying wet spent activated carbon at high temperatures for a more efficient regeneration.

DESCRIPTION OF THE PRIOR ART

For the purpose of regeneration of spent activated carbon, a small-sized vertical regeneration equipment is heretofore used.

In such a vertical regeneration equipment, a regeneration reactor is provided in a vertical heating furnace, and operations are performed as follows: spent activated carbon is fed to the regeneration reactor from above; the particles of the spent activated carbon then fall gravitationally while being heated; during that time, substances that have been adsorbed are thermally decomposed and, in addition, reaction gases are blown in to facilitate regeneration of the spent activated carbon; and thus the particles of reactivated carbon are discharged from the bottom of the regeneration reactor in metered quantities.

In such a conventional vertical regeneration equipment, the particles of the spent activated carbon must be well mixed for uniform heating, because they fall filling the inside of the regeneration reactor; in addition, it cannot be expected that an excellent regeneration capacity is achieved, if it is impossible to blown in sufficient reaction gases. In order to overcome these difficulties, it is required to smoothly exhaust the gases that have finished reactions, without scattering the particles of activated carbon.

Besides, spent activated carbon is mostly wet, and therefore requires an effective drying process when regenerated, and it is essential to provide means for preventing the malodour of waste gases produced in the drying processes.

In view of the above-mentioned problems, various improvements have been heretofore introduced in the conventional regeneration equipment. For example, in order to facilitate mixing of carbon particles and flow of reaction gases, steeply inclined annular plates are provided in the multistage manner on the inside surface of the cylindrical wall of the regeneration reactor and also on the outside surface of the cylindrical wall of the vertical tube provided at the central portion of the regeneration reactor, being arranged so that those on the regeneration reactor alternate vertically with those on the vertical tube; in addition, air holes are provided in the cylindrical wall of the regeneration reactor and that of the vertical tube. As to the drying of spent activated carbon, it is considered advantageous in terms of the thermal efficiency and in cost of the regeneration equipment to perform the drying process outside of the heating furnace for regeneration while utilizing hot waste gases generated from the heating furnace; for instance, there is a drying system in which hot waste gases from the heating furnace are introduced in the screw feeder to heat and dry spent activated carbon indirectly from the outside, and also there is a system in which air is increased in temperature by exchanging heat with the hot waste gases and is then fed into the screw feeder directly for drying.

In order to prevent the secondary pollution, there are systems in which the drying-process waste gases are subjected to afterburning or used as the secondary air for the burners of the heating furnace.

In case of the conventional vertical regeneration equipment, it cannot be said that the equipment thoroughly mixes the spent activated carbon particles therein, especially those at the central portion of the regeneration reactor and those at the peripheral portion thereof between which a great temperature difference exists when being heated. In addition, the gases that have finished reactions are not smoothly exhausted, and therefore the flow rate of reaction gases blown in is limited to a low level; for this reason, when the flow rate of reaction gases blown in is increased in consideration of the adsorption capacity of the spent activated carbon, the particles of reactivated carbon tend to scatter entraining on the exhaust gases thereby to increase the regeneration loss of carbon.

The regeneration performance of the equipment largely depends upon the capacity thereof for carrying out the abovementioned contact mixing and that of exhausting the gases that have finished reactions.

The conventional process for drying the spent activated carbon has disadvantages in that it has difficulties in the drying rate because the drying-process waste gases are not satisfactorily exhausted and in that provision of the afterburner for treating the drying-process waste gases would increase the equipment cost so much.

SUMMARY OF THE INVENTION

Accordingly, it is an object of the present invention to provide a small-sized, high-performance regeneration equipment for spent activated carbon, which can eliminate the above-mentioned disadvantages of the prior art, can perfectly perform the abovementioned radial contact mixing of carbon particles and discharge of various gases such as those that have finished reactions, can prevent the regeneration loss of reactivated carbon, can smoothly dry the spent activated carbon, and can economically treat the drying-process waste gases.

This and other objects have been attained by the regeneration equipment for spent activated carbon which comprises a regeneration reactor provided vertically through a heating furnace and having therein an integrated body of a longitudinal series of numerous spiral elements fixedly provided almost throughout the length of said regeneration reactor, steam ducts provided so that they are inserted in said regeneration reactor at about the middle portion thereof, exhaust chambers fixedly provided on the outside surface of the wall of said regeneration reactor, each of said exhaust chambers communicating at its bottom portion with the inside of said regeneration reactor through exhaust holes provided in the wall of said regeneration reactor. Each of said exhaust chambers are filled with heat-resisting balls piled up in three layers so that the balls in the top and bottom layers are larger in diameter than said exhaust holes and those in the middle layer are similar in diameter to activated carbon particles.

The regeneration equipment for spent activated carbon further comprises a drying hood provided on the top of said heating furnace and to which hot waste gases are supplied from said heating furnace, a drying hopper provided through said drying hood and on the top of said regeneration reactor, and a drying-process waste gas exhaust pipe provided inside said drying hopper and having an opening in the vicinity of the uppermost end of said integrated body of the spiral elements in said regeneration reactor.

The various features of novelty which characterize the invention are pointed out with particularity in the claims annexed to and forming a part of this disclosure. For a better understanding of the invention, its operating advantages and specific objects attained by its uses, reference should be had to the accompanying drawings and descriptive matter in which there are illustrated preferred embodiments of the invention.

DESCRIPTION OF THE PREFERRED EMBODIMENTS

Figure 1:
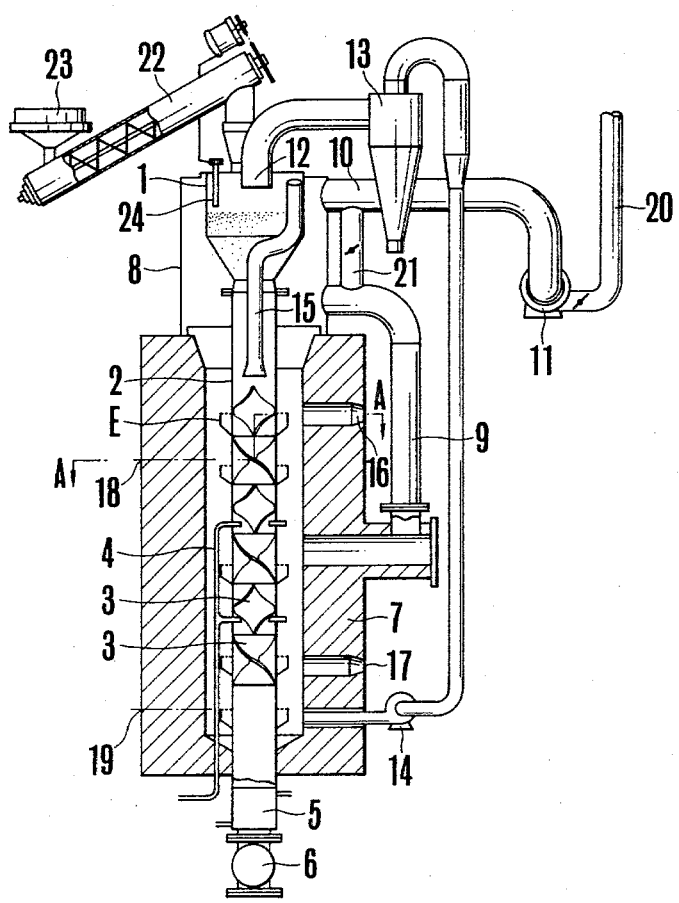
FIG. 1 is a longitudinal sectional view of a preferred embodiment of the present invention.

Now, a preferred embodiment of the present invention will be hereinafter described with reference to the accompanying drawings.

The regeneration equipment for spent activated carbon according to the present invention consists mainly of a drying hopper 1, a regeneration reactor 2, steam ducts 4, a cooler 5, a rotary valve 6, a heating furnace 7, a drying hood 8, a hot waste gas exhauster 11, a blower 14, and a screw feeder 22.

Figure 4:
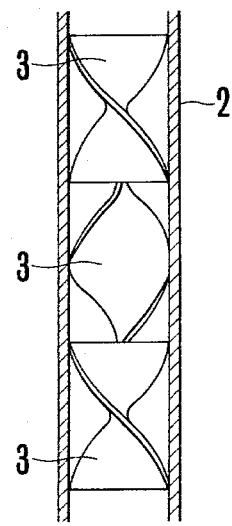
FIG. 4 is an enlarged longitudinal sectional view of the essential part (a part of the static or stationary mixer) of the regeneration reactor.

As shown in FIG. 1, the regeneration reactor 2 is provided through the heating furnace 7, communicating with the drying hopper 1. In the regeneration reactor, there is fixedly provided an integrated body of a longitudinal series of numerous spiral elements 3 (a static or stationary tubular mixer). As shown in FIG. 4, the static or stationary mixer is provided so that the spiral elements 3 positioned radially at right angles to each other are alternately connected together at their points of contacts; each of the spiral elements 3 is so formed that its upper and lower halves are twisted opposite to each other.

Several steam ducts 4 are connected to the regeneration reactor 2 at about the central portion thereof. Several exhaust chambers E are fixed to the outside wall of the regeneration reactor 2.

Figure 3:
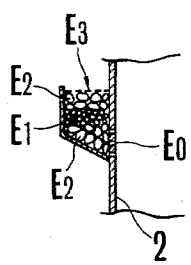
FIG. 3 is an enlarged detailed view of an exhaust chamber provided on the regeneration reactor.

As shown in FIG. 3, the exhaust chamber 3 communicates at its bottom portion with the regeneration reactor 2 through a number of exhaust holes $E_0$ provided radially in the wall of the regeneration reactor 2. The exhaust chamber E is filled with heat-resisting balls in three layers so that the balls $E_2$ in the top and bottom layers are slightly larger in diameter than the exhaust hole $E_0$ and the balls $E_1$ in the middle layer are similar in diameter to the small particles of activated carbon; in addition, the top of the exhaust chamber E is pressed down by a punched steel plate cover $E_3$.

Figure 2:
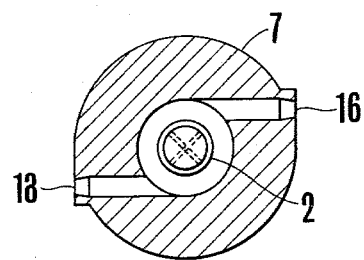
FIG. 2 is a sectional view taken along the line A—A of FIG. 1.

The heating furnace 7 is provided at its upper and lower portions with burners 16, 17, 18 and 19, two for each as shown. The burners 16 and 18 or the burners 17 and 19 have injection nozzles directed tangentially to the inside surface of the wall of the heating furnace 7 so that the flames of the burners may not touch the regeneration reactor directly, as shown in FIG. 2.

The drying hood 8 is provided on the top of the heating furnace 7, being connected to a hot waste gas duct 9 and to the suction side of the hot waste gas exhauster 11 through a duct 10. Besides, the drying hopper 1 is provided through the drying hood 8.

The drying hopper 1 is connected at its top with the outlet of the screw feeder 22 and a suction pipe 12 for drying-process waste gases. In addition, the drying hopper 1 is provided therein with a drying-process waste gas exhaust pipe 15. A level switch 24 is inserted in the drying hopper 1 to automatically control the screw feeder 22.

The drying-process waste gases are recycled to the heating furnace 7 through the suction pipe 12, a cyclone 13 and the blower 14 so as to burn inflammables.

Rererence numeral 20 designates a stack, 21 a bypass for hot waste gases, and 23 a hopper for receiving spent activated carbon.

With the above-mentioned construction, the foregoing preferred embodiment of the present invention may be operated as follows:

Spent activated carbon is first fed into the hopper 23 in slurry form and is dehydrated while being conveyed upward by the screw feeder 22, being then supplied to the drying hopper 1. (In this case, water from the spent activated carbon flows out through a wire gauze provided around the upper part of the hopper 23, returning to a waste water pit.)

The screw feeder 22 is automatically operated and stopped by the level switch 24 inserted in the drying hopper 1, and therefore the amount of the spent activated carbon supplied is at all times kept at a fixed level as schematically shown in FIG. 1. In the drying hopper 1, the spent activated carbon is indirectly heated (at about 120° C.) and dried by hot waste gases introduced into the drying hood 8 from the heating furnace 7.

The particles of the spent activated carbon are gradually lowered gravitationally, and enter the regeneration reactor 2. In the regeneration reactor 2, the spent activated carbon particles are heated by the heating furnace 7, reaching the uppermost spiral element 3 where their flow begins to branch and merge and thereby they are subjected to a mixing action. While being passed through a series of the spiral elements 3, the spent activated carbon is fully mixed radially, being therefore uniformly heated; simultaneously, adsorbates are thermally decomposed or pyrolyzed.

As the carbon particles are further lowered, they are uniformly heated to higher temperatures by the same mixing action as mentioned above, attaining to 850° C. to 900° C. Thus, at about the central section of the regeneration reactor 2, the carbon particles are brought into contact with superheated steam introduced through the steam ducts 4 and react therewith. As a result, the carbides of difficult-to-desorb adsorbates are gasified. (Regeneration refers to the thermal decomposition and steam gasification of adsorbates mentioned above.)

Several exhaust chambers E are provided on and around the regenration reactor 2, as mentioned above. The gases produced by the above-mentioned thermal decomposition and steam gasification are discharged from the reactor 2 into the exhaust chamber E through a number of exhaust holes $E_0$ provided in the wall of the reactor 2 as shown in FIG. 3. In this case the activated carbon particles entraining on the gases that have finished reactions are made to enter the bottom part of the exhaust chamber E; however, the pressure of the exhaust gases are lowered because of the wide sectional area of the exhaust chamber E and, as a result, the activated carbon particles are prevented from scattering by the action of the heat-resisting balls $E_1$ and $E_2$ filled in the exhaust chamber E, and only the gases that have finished reactions pass through spaces present among the heat-resisting balls $E_1$ and $E_2$ to enter the heating furnace 7 for combustion.

As mentioned above, the gases that have finished reactions are smoothly exhausted by provision of the exhaust chambers E. Therefore, the amount or flow rate of steam blown in can be made greater than that conventionally adopted, and thereby the regeneration performance can be improved and the regeneration loss of activated carbon can be minimized. Regenerated activated carbon is gradually cooled in the cooler 5, being taken out by the rotary valve 6 in metered quantities.

In the drying hopper 1, meanwhile, the spent activated carbon is dried as afore-mentioned. The exhaust pipe 15, which is provided in the drying hopper 1 to facilitate gas removal, is found to be effective for smooth drying. In addition, malodorous drying-process waste gases are collected in the suction pipe 12, being recycled, through the cyclone 13 and the blower 14, to the bottom of the heating furnace 7 where inflammables are burnt. For example, when this method was applied to the regeneration of activated carbons that had used in a catechol-producing plant, it was found that the gases recycled to the heating furnace 7 was burnt very well thereby making remarkable fuel saving possible.

As mentioned above, the gases that have produced in the regeneration process and have finished reactions, malodorous gases produced in the drying process, and the like, are all burnt in the heating furnace 7 to finally obtain pollution-free waste gases which are discharged into the air by the hot waste gas exhauster 11.

The following is an example of the regeneration equipment for spent activated carbon according to the present invention. Six spiral elements were provided in a regeneration reactor 150 mm in inside diameter and 2,880 mm in length. Five exhaust chambers were fixedly provided on the outside surface of the wall of the regeneration reactor. The exhaust chambers were filled with heat-resisting porcelain balls 6 mm and 12 mm in diameter. This regeneration reactor was externally heated, and regenerates spent activated carbon that has been used for treating industrial waste water. Test results that were obtained are given below in Table 1:

Quantity of carbon regenerated:   9 kg/hr
Regeneration temperature:   900° C.
Quantity of steam:   0.4 kg/kg-activated carbon
Regeneration time:   2.3 hr Table 1

|  | New activated carbon | Regenerated activated carbon |
| --- | --- | --- |
| Yield (%) | — | 96 |
| Benzol adsorbing capacity (%) | 34.6 | 35.6 |
| Methylene blue decolorizing capacity (ml/g) | 180 | 190 |

The following Table 2 shows the test results of a comparative example in which six inclined annular plates of the prior art are provided in a regeneration reactor having the same size as that adopted in the above example:

Table 2

|  | New activated carbon | Regenerated activated carbon |
| --- | --- | --- |
| Yield (%) | — | 90.1 |
| Benzol adsorbing capacity (%) | 34.6 | 30.1 |
| Methylene blue decolorizing capacity (ml/g) | 180 | 170 |

The following Table 3 shows the results of comparative examples embodying the drying system of the present invention:

Table 3

| Q'ty regenerated Item | 9 kg/hr Without drier | 9 kg/hr With drier |
| --- | --- | --- |
| Fuel consumption | 2.4 Nm³/hr | 1.8 Nm³/hr |
| Waste gas temperature | 750° C. | 330° C. |
| Furnace temperature | 970 ° C. | 970° C. |
| Drying hopper temperature | 120° C. | 120° C. |
| Thermal effeciency | 23.2 % | 30.9 % |

Fuel: Propane gas (High calorific value = 24,160 kcal/Nm³)

While specific embodiments of the invention have been shown and described in detail to illustrate the application of the principles of the invention, it will be understood that the invention may be embodied otherwise without departing from such principles.

What is claimed is:

1. A regeneration equipment for spent activated carbon, having a regeneration reactor provided vertically through a vertical heating furnace, comprising an integrated body of a longitudinal series of numerous spiral elements fixedly provided almost throughout the length of said regeneration reactor, steam ducts provided so that they are inserted in said regeneration reactor at about the middle portion thereof, and exhaust chambers fixedly provided on the outside surface of the wall of said regeneration reactor, each of said exhaust chambers communicating at its bottom portion with the inside of said regeneration reactor through exhaust holes provided in the wall of said regeneration reactor.

2. A regeneration equipment according to claim 1, wherein each of said spiral elements is so formed that its upper and lower halves are twisted opposite to each other, said elements being positioned radially at right angles to each other and alternately connected together at their points of contacts.

3. A regeneration equipment according to claim 1, wherein each of said exhaust chambers being filled with heat-resisting balls piled up in three layers, the balls in the top and bottom layers being larger in diameter than said exhaust holes and those in the middle layer being similar in diameter to activated carbon particles.

4. A regeneration equipment according to claim 1, further comprising a drying hood provided on the top of said heating furnace and being supplied thereto hot waste gases from said heating furnace, a drying hopper provided through said drying hood and on the top of said regeneration reactor.

5. A regeneration equipment according to claim 4, said drying hopper includes a drying-process waste gas exhaust pipe having an opening in the vicinity of the uppermost end of the integrated body of the spiral elements provided in the regeneration reactor.

* * * * *